Figure 1:
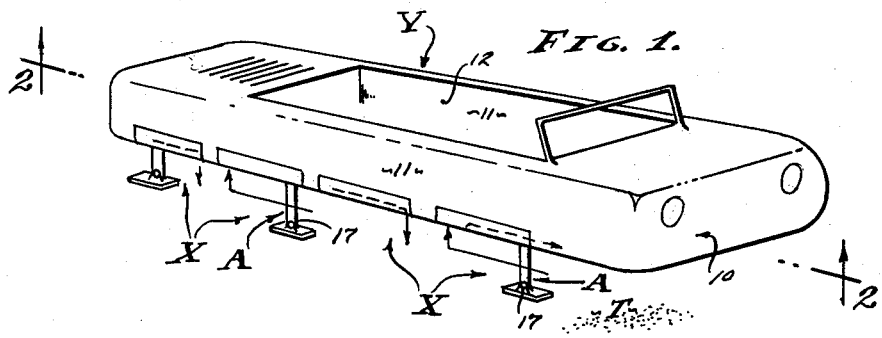

June 2, 1964     A. W. SCRUGGS     3,135,345
MULTI-PED VEHICLE
Filed Feb. 6, 1961                                  2 Sheets-Sheet 1

INVENTOR.
ARTHUR W. SCRUGGS
BY
W. H. Maxwell
AGENT

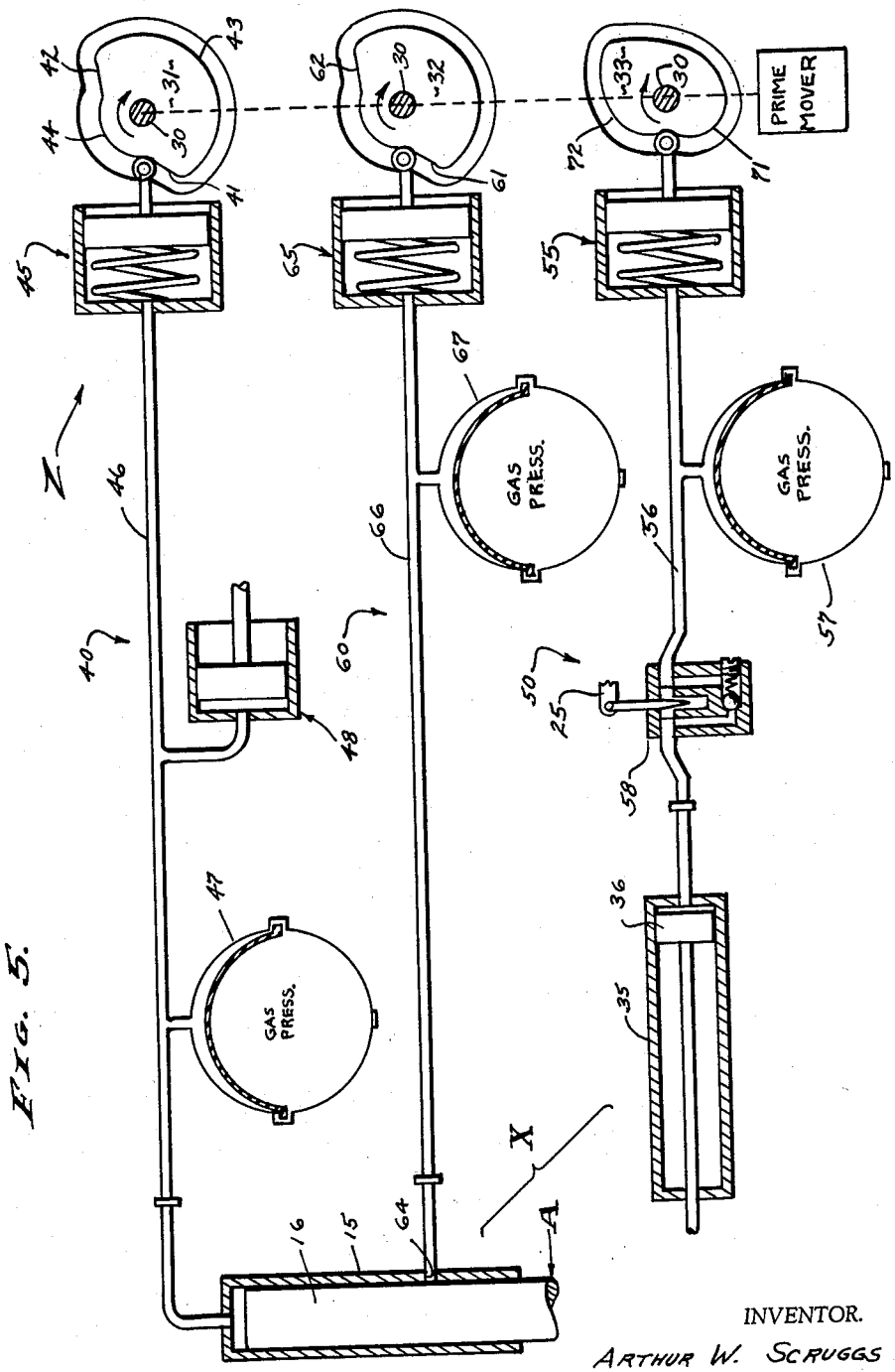

3,135,345
MULTI-PED VEHICLE
Arthur W. Scruggs, P.O. Box 43, Bloomington, Calif.
Filed Feb. 6, 1961, Ser. No. 87,245
13 Claims. (Cl. 180—8)

This invention relates to transporting vehicles and is particularly concerned with legged vehicles for operation over rough terrain. Further, this invention is concerned with other than wheeled or track-laying vehicles and deals with vehicles that have movable supports that operate in timed relationship to support and propel the vehicles.

Wheeled vehicles are universally understood and it is well known that they are adapted to relatively high speed and satisfactory operation on roads that are provided therefor. However, when roads are imperfect or destroyed, or not at all available, then a wheeled vehicle becomes surprisingly useless. There are, however, track laying vehicles that have substantial utility in overcoming the obstacle of deficient roads or non-existence thereof, but these vehicles also have limitations inherent in the tracks that operate over wheels and rollers. In any case, vehicles in general use today do not operate satisfactorily over rough terrain, or if they do their operation is very uncertain. And, by rough terrain I mean to include natural ground, sand and bogs, and mountainous formations and waters and all of these studded with out-croppings and/or depressions and covered with natural vegetation. Of course, there will be certain limitations of the instant vehicle, depending upon its size and design and upon its intended use.

This invention has to do with a vehicle having a plurality of supporting legs that are movable to propel the vehicle, it being a general object of this invention to provide a vehicle of this description that is versatile and adapted to operate where other types of vehicles are inoperable.

It is an object of this invention to provide a utilitarian vehicle adapted for exploration, as by sportsmen, geologists and surveyors and adapted for commercial applications, as by farming and construction industries. The vehicle of the present invention is inherently useful as transportation means and/or as traction means and it is operable within obvious limits over almost any terrain.

An object of this invention is to provide a vehicle of the character referred to that operates hydro-mechanically to literally walk over terrain and to overcome obstacles and imperfections in said terrain, when and if they occur.

Another object of this invention is to provide a vehicle of the character referred to that has individually operable supporting units that normally work in timed relationship but which are not dependent upon one another. With the structure herein disclosed there can be destruction of one or more supporting units without inoperation of the vehicle as such.

It is also an object of this invention to provide a vehicle that walks upon legged supports and which is feasible and inherently operable for the purposes intended, to negotiate rough terrain at reasonable speed and without preparation and/or resort to use of roadways and the like.

Figure 2:
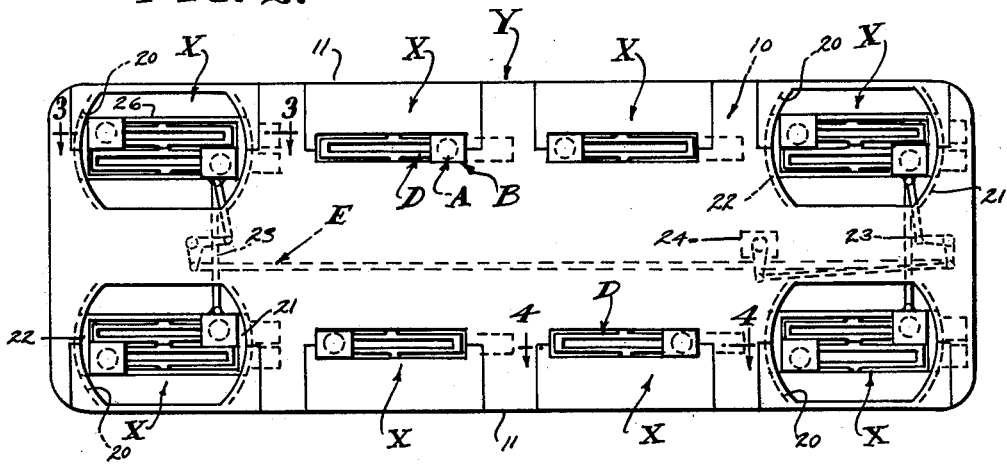
Figure 3:
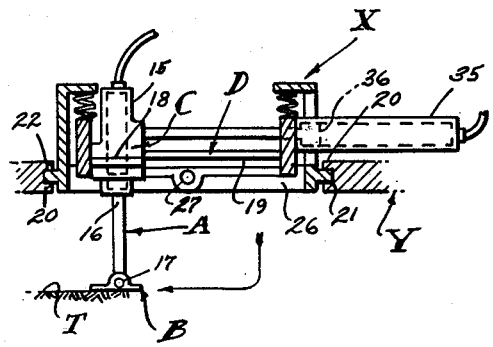
Figure 4:
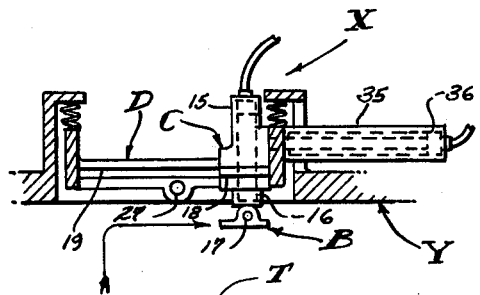

The various objects and features of this invention will be fully understood from the following detailed description of the typical preferred form and application thereof, throughout which description reference is made to the accompanying drawings, in which:

FIG. 1 is a perspective view of the multi-ped vehicle of the present invention, showing a preferred embodiment thereof. FIG. 2 is a bottom view of the structure taken as indicated by line 2—2 on FIG. 1. FIGS. 3 and 4 are enlarged sectional views taken substantially as indicated by lines 3—3 and 4—4 on FIG. 2; and FIG. 5 is a diagram of the hydraulic and mechanical drive that I provide for operating the supporting elements of the vehicle.

The multi-ped vehicle that I provide can vary widely in size and proportioning, and in its purpose. A typical machine is illustrated in the drawings and characterized by a plurality of supporting units X that cooperatively carry and propel a chassis Y over terrain T. It is to be understood that two or more units X can be employed in the support of and propelling of a balanced machine, it being preferred to employ pairs of units X, for example three or four pairs of units X. As shown throughout the drawings, the chassis Y is supported from the terrain T having natural irregularities, the pairs of units X being powered by a prime mover unit Z.

The chassis Y is shown as a rectangular structure that is flat and horizontally disposed and having a frame 10, sides 11 and a passenger compartment 12. The frame 10 forms a platform that is supported by the plurality of units X and it carries the various other elements of the invention. The said sides 11 appropriately establish an enclosure for the elements involved and the compartment 12 accommodates passengers and pay load and the driver or pilot of the vehicle.

Because the structure of this invention can take various specific forms it is illustrated somewhat diagrammatically in the drawings with general reference made to the structural components and elements involved.

In the case illustrated, where four sets of units X are employed said units are arranged in two series, one at each side of the vehicle. There may be variations in this formation but it is preferred that the units X be arranged in said series, as pairs of units opposite each other with one unit X at each side of the vehicle, and further with a pair of units X at each corner of the vehicle. Therefore, at least four units X are placed along each side of the frame 10, equally spaced therealong, and the units X of each pair being arranged at opposite sides of the vehicle, respectively. The said arrangement is significant in that each unit is independently operable to aid in the support of and in the propelling of the vehicle, and there is always ground engagement with the terrain at all four corners of the vehicle (under normal conditions).

The units X are basically alike, in that each involves a leg A with a foot B and a carriage C operable in a guide D. The vehicle can be made steerable in various ways and in this respect the guides D of both the front and rear pairs of units X are rotatably mounted by steering means E. The guides D are mounted in the frame 10 of the chassis Y, the front and rear pairs being rotatably mounted by the means E and the intermediate pairs being fixedly mounted, as shown.

The leg A is a vertical shiftable element adapted to be lowered and raised relative to the platform shaped chassis Y. The mechanical parts of the structure are hydraulically operated and the leg A is therefore an element of the cylinder and piston unit used in operating the same, there being a cylinder 15 carried by the carriage C and a ram or piston 16 operable to extend from and to retract into said cylinder. The lower end of the cylinder 15 is about flush with the bottom of the chassis Y so that the leg A is substantially retracted when lifted by retraction of the piston 16.

The foot B can vary, as circumstances require, and it is carried by the lower terminal end of the leg A. The foot B can be rigidly affixed to the leg A or, as is preferred, it is swivelly coupled to the leg as by a pivot or ball and socket joint 17. The said joint 17 can be readily fashioned to control disposition of the foot B, to limit swivelling thereof, and to feather it with relative forward motion and to transversely dispose it relative to rearward motion, all to the end that propelling action is attained when operating in water. It is to be understood, therefore, that the chassis Y is also a vessel having sufficient displacement for floatation of the vehicle.

The carriage C that is operable in the guide D is preferably a rigid element, and in the case illustrated it takes form in the cylinder 15 that retractably carries the piston 16 forming the leg A. Additionally, the carriage C involves suitable means to cooperatively engage with the guide D, for example slides 18 disposed so that the carriage can be shifted horizontally.

The guide D is horizontally disposed and is normally fixed in the frame 10 to extend in a fore and aft direction. Thus, the carriage C reciprocates fore and aft, there being ways 19 to cooperatively receive the slides 18, in a captive manner holding the leg A in its erect position or vertically, as above specified.

The two pairs of intermediate units X involve guides D that are fixedly mounted as above specified. However, as hereinabove set forth, the front and rear double pairs of units X involve steering means E whereby the guides D are rotatably mounted in the frame 10. As shown, the frame 10 is provided with arcuate tracks 20 to receive both the front and rear ends 21 and 22 of the guide D, respectively, said guides being double guides with a pair of parallel ways 19 side by side. The said tracks 20 are carried about a center of rotation with links 23 extending between opposite side units X, and controlled from a steering gear 24 through a suitable bell-crank and linkage 25. Further, each guide D can be mounted for limited pitching motion, as shown, in which case the ways 19 are pivotally mounted in a carrier 26 that has said front and rear ends 21 and 22 engaged with the tracks 20. The said ways 19 are pivotally coupled to the carrier 26 on a normally transverse horizontal axle 27, and they are free to have limited rotation under a spring suspension 28. If desired, means can be provided to positively position the ways 19 in order to gain the desired inclination of pitch.

With the structure thus far described it will be apparent that each leg is operable both vertically and horizontally to move the foot B from a retracted position to a supporting position to shift the foot longitudinally of the frame 10 in a fore and aft direction. The prime mover unit Z is shown schematically in FIG. 5 of the drawings. The said unit Z is driven by a suitable engine, for example by an internal combustion engine that rotates a drive shaft 30 having a series of cams 31, 32 and 33 thereon. There are, of course, various ways in which it is possible to transmit motion and a definite rule of action to the plurality of supporting units X, it being preferred to employ a system of cams that mechanically operate hydraulic means to actuate the legs A and carriages C. As shown, each unit X employs a set of cams 31, 32 and 33 on the drive shaft 30, cam 31 actuating the leg A through the cylinder 15 and piston 16, cam 33 actuating the carriage C through a cylinder 35 and piston 36, and a cam 32 actuating the leg A the same as above to extend its stroke when circumstances require.

In practice, opposite legs A of each pair of legs will be actuated alternately, in that one leg will be extended while the other is retracted. In the drawings, I have illustrated but one unit X and only that portion of the prime mover unit Z that pertains thereto. It will be readily apparent that the driving structure to be described is equally applicable to each unit X, the cams 31, 32 and 33 being rotatably positioned on the drive shaft 30 to actuate said units X, as required.

The prime mover unit Z, as it relates to each unit X, involves leg actuating means 40, carriage actuating means 50 and leg extending means 60. The means 40 acts to extend and to retract the leg A with its foot B, while the means 60 acts to project the extending of the leg and foot. The means 50 acts to shift the carriage C fore and aft in order to advance the leg and foot for each supporting engagement with the terrain T and for rearward motion to effect propelling action. The cams 31, 32 and 33 have tracks that advance and retract followers, aided by return springs, as shown, and the cylinder and piston units 15—16 and 35—36 can be double acting with the addition of suitable piping if so desired.

The leg actuating means 40 that extends and retracts the leg A operates the leg to reciprocate it, and involves the cam 31 having an inclined face 41 to extend the leg and a declined face 42 to retract the leg. The said cam has an upper land 43 to maintain extension of the leg, and it has a lower land 44 to maintain retraction thereof. In carrying out the invention, it is necessary to retract and to extend the leg A quickly in order to maintain at least half-time-engagement with the terrain T, and therefore, the land 44 is considerably shorter in circumferential extent than the land 43.

Transmission of power is established hydraulically to the cylinder 15 from a cylinder and piston unit 45 through a tubing 46, there being suitable flexible connections as required. The cylinder and piston unit 45 is operated by the cam 31 by means of a roller follower that actuates the piston of the unit 45 to move fluid in the tubing 46 and an accumulator 47 is in open communication with the tubing 46 and is biased to receive fluid when a certain predetermined pressure is exceeded. As a result, an obstruction above the normal level of the terrain T is compensated for. Further, in order to shorten the stroke, length, or extension of the leg A, a variable cylinder and piston unit 48 is provided in communication with the tubing 46. The unit 48 is manually controllable and accommodates fluid delivered by the unit 45, whereby displacement of the piston 16 is decreased.

The leg extending means 60 that projects the leg A and foot B involves the cam 32 having an inclined face 61 to extend the leg and a declined face 62 to retract extension of the leg. In carrying out the invention it is sometimes desirable to increase the extension of the leg A beyond a normal position gained by operation of the means 40. Transmission of power is established hydraulically to the cylinder 15 from a cylinder and piston unit 65, through a tubing 66, there being suitable flexible connections, as required. The tubing 66 opens into the cylinder 15 at a port 64 that is uncovered by the piston 16, at the normal end of its stroke as effected by means 40. There is an accumulator 67 in open communication with the tubing 66 and biased to receive fluid when a certain predetermined pressure is exceeded. As a result, additional fluid is discharged under pressure into the cylinder 15 when the port 64 is uncovered by the piston 16, whereby the leg A and foot B are extended into abnormal depressions in the terrain T.

The carriage actuating means 50 that advances and retracts the leg A and foot B operates the carriage to reciprocate it, and involves the cam 33 having arcuately inclined and arcuately declined faces 71 and 72. The inclined face 71 acts to advance the carriage C rearwardly, while the declined face 72 acts to retract the carirage C forwardly. As hereinabove described, there is a cylinder 35 that has a piston 36 operating therein, said piston 36 being operably coupled to the carriage C while the cylinder 35 is anchored to the frame 10, or carrier 26. In carrying out the invention the inclined face 71 of cam 33 is operable to shift the carriage C rearwardly when the leg A is extended, and the face 72 is operable to shift the carirage C forwardly when the leg A is retracted. The exact timed relationship can vary as circumstances require.

Transmission of power is established hydraulically to the cylinder 35 from a cylinder and piston unit 55 and through a tubing 56, there being suitable flexible connections as required. The cylinder and piston unit 55 is operated by the cam 33 by a roller follower that actuates the piston of the unit 35 to move fluid in the tubing 56. An accumulator 57 is in open communication with the tubing 56 and is biased to receive fluid when a certain predetermined pressure is exceeded. Further, there is a variable orifice valve 58 in the tubing 56 under control of the steering linkage 25, or by other servo means, and operable to decrease flow of fluid to the cylinder 35. The linkage 25 gradually closes the valve 58 (at one side of the vehicle or the other) in order to effect turning, and the fluid that is not used is accommodated in the accumulator 57. On the return stroke fluid is passed easily through a check valve without restriction. Thus, differential in traction is compensated for while maintaining full driving stroke at the units X at the outside turning portion of the vehicle.

From the foregoing it will be apparent that the prime mover unit Z will actuate the independently operable supporting units X, in timed relationship. For example, when four or more pairs of units X are employed, one leg of each pair of units will have supporting engagement with the terrain, while the other four legs are being retracted and advanced. The supporting action of the units X is controlled by selecting a suitable bias pressure for the accumulators 47, 57 and 67. The said units X engaged with the ground are preferably at alternate sides of the vehicle and while the vehicle is balanced and braced thereby. Rearward motion of the carriages occurs resulting in propelling action. The units X can be suspended in various ways that are common to vehicle construction, with springs and linkage and shock adsorbers and the like. It is possible, therefore, for the instant vehicle to walk on said legs and/or to swim, all as hereinabove described, and above all to seek firm footing for assured advancement over rough and uncertain terrain. The exact nature of the vehicle controls can vary widely, it being apparent that speed and direction controls are supplied as circumstances require.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A multi-ped vehicle of the character described including, a horizontally disposed chassis, a plurality of pairs of alternately operable support units therefor and with the units of each pair at opposite sides of the vehicle, each of said units comprising a vertically extensible and retractable leg, a carriage for the leg and said carriage shiftably mounted on the chassis, and means to alternately operate said units to successively shift one leg at a time vertically relative to the carriage and to shift the carriage relative to the chassis in order to move the leg relative thereto.

2. A multi-ped vehicle of the character described including, a horizontally disposed chassis, a plurality of pairs of alternately operable support units therefor and with the units of each pair at opposite sides of the vehicle, each of said units comprising a vertically extensible and retractable leg, a carriage for the leg and said carriage shiftably mounted on the chassis, steering means to turn at least one pair of said units and comprising means rotatably mounting the carriage in the chassis and manually operable means to simultaneously direct the same, and means to alternately operate said units to successively shift one leg at a time vertically relative to the carriage and to shift the carriage relative to the chassis in order to move the leg relative thereto.

3. A multi-ped vehicle of the character described including, a horizontally disposed chassis, front and rear pairs of alternately operable support units therefor and with the units of each pair at opposite sides of the vehicle, each of said units comprising a vertically extensible and retractable leg, a carriage for the leg and shiftably mounted on the chassis, steering means to turn the said front and rear pairs of said units and comprising means rotatably mounting the carriage in the chassis and manually operable means to simultaneously direct the same, and means to alternately operate said units of each pair to successively shift the respective legs thereof to move said legs vertically relative to their respective carriages and to shift the said respective carriages relative to the chassis in order to move the legs longitudinally relative thereto.

4. A multi-ped vehicle of the character described, including, a horizontally disposed chassis, front and rear and intermediate pairs of alternately operable support units therefor and with the units of each pair at opposite sides of the vehicle, each of said units comprising a vertically extensible and retractable leg, a carriage for the leg and shiftably mounted on the chassis, steering means to turn the said front and rear pairs of said units and comprising means rotatably mounting the carriage in the chassis and manually operable means to simultaneously direct the same, and means to alternately operate said units of each pair to successively shift the respective leg thereof to move said legs vertically relative to their respective carriages and to shift the said respective carriages relative to the chassis in order to move the legs longitudinally relative thereto.

5. A multi-ped vehicle of the character described including, a horizontally disposed chassis, front and rear and intermediate pairs of alternately operable support units therefor and with the units of each pair at opposite sides of the vehicle, each of said units comprising a vertically extensible and retractable leg, a carriage for the leg and shiftably mounted on a slide pivoted horizontally to the chassis, steering means to turn the said front and rear pairs of said units and comprising means rotatably mounting the carriage in the chassis and manually operable means to simultaneously direct the same, and means to alternately operate said units of each pair to successively shift the respective legs thereof to move said legs vertically relative to their respective carriages and to shift the said respective carriages relative to the chassis in order to move the legs longitudinally relative thereto.

6. A multi-ped vehicle of the character described including, a horizontally disposed chassis, a plurality of support units therefor at each side of the chassis and each of said units comprising a horizontally shiftable carriage and cylinder and piston means to reciprocate the same, a vertically shiftable leg carried by the carriage and cylinder and piston means to extend and retract the said leg, and means actuating each of said cylinder and piston means and comprising a prime mover and a plurality of cams rotated thereby, and including further cylinder and piston means for each of said units and each said further piston and cylinder means operated by one of said cams through a follower, and a fluid connection extending from said further cylinder and piston means to the cylinder and piston menas at said units whereby movement of the leg is governed by motion of the cam.

7. A multi-ped vehicle of the character described including, a horizontally disposed chassis, a plurality of support units therefor at each side of the chassis and each of said units comprising a horizontally shiftable carriage and cylinder and piston means to reciprocate the same, a vertically shiftable leg carried by the carriage and cylinder and piston means to extend and retract the said leg, and means actuating each of said cylinder and piston means and comprising a prime mover and a plurality of cams rotated thereby, and including further cylinder and piston means for each of said units and each said further piston and cylinder means operated by one of said cams through a follower, fluid connection means extending from said further cylinder and piston means to the cylinder and piston means at said units, and accumulator means in said fluid connection means whereby movement of the leg is governed by the motion of the cams and fluid is diverted into said accumulator means when obstructions are encountered by the leg.

8. A multi-ped vehicle of the character described including, a horizontally disposed chassis, a plurality of support units therefor at each side of the chassis and each of said units comprising a horizontally shiftable carriage and cylinder and piston means to reciprocate the same, a vertically shiftable leg carriaed by the carriage and cylinder and piston means to extend and retract the said leg, and means actuating each of said cylinder and piston means and comprising a prime mover and a plurality of cams rotated thereby, and including further cylinder and piston means for each of said units and each said further piston and cylinder means operated by one of said cams through a follower, fluid connection means extending from said further cylinder and piston means to the cylinder and piston means at said units, said fluid connection means including a fluid connection and a variable displacement means in said fluid connection diverting fluid into said displacement means to lessen movement of said leg.

9. A multi-ped vehicle of the character described including, a horizontally disposed chassis, a plurality of support units therefor at each side of the chassis and each of said units comprising a horizontally shiftable carriage and cylinder and piston means to reciprocate the same, a vertically shiftable leg carried by the carriage and cylinder and piston means to extend and retract the said leg, and means actuating each of said cylinder and piston means and comprising a prime mover and a plurality of cams rotated thereby, and including further cylinder and piston means for each of said units and each said further piston and cylinder means operated by one of said cams through a follower, fluid connection means extending from said further cylinder and piston means to the cylinder and piston means at said units, said fluid connection means including a fluid connection, accumulator means in said fluid connection diverting fluid into said accumulator means when encountering obstructions and a variable displacement means in said fluid connection diverting fluid into said displacement means in order to lessen movement of said leg.

10. A multi-ped vehicle of the character described including, a horizontally disposed chassis, a plurality of support units therefor at each side of the chassis and each of said units comprising a horizontally shiftable carriage and cylinder and piston means to reciprocate the same, a vertically shiftable leg carried by the carriage and cylinder and piston means to extend and retract the said leg, and means actuating each of said cylinder and piston means and comprising a prime mover and a plurality of cams rotated thereby, and including further cylinder and piston means for each of said units and each said further pison andt cylinder means operated by one of said cams through a follower, a port at the lower end of said cylinder and piston means associated with the shiftable leg to be uncovered by the piston thereof, and fluid connection means extending from said further cylinder and piston means to the cylinder and piston means at said units whereby movement of the leg is governed by the motion of the cams, said further piston and cylinder means including a cylinder and piston arrangement operated by one of said cams through said follower and said fluid connection means including a fluid connection extending to said port whereby movement of the piston is extended when said port is uncovered.

11. A multi-ped vehicle of the character described including, a horizontally disposed chassis, a plurality of support units therefor at each side of the chassis and each of said units comprising a horizontally shiftable carriage and cylinder and piston means to reciprocate the same, a vertically shiftable leg carried by the carriage and cylinder and piston means to extend and retract the said leg, and means actuating each of said cylinder and piston means and comprising a prime mover and a plurality of cams rotated thereby, and including further cylinder and piston means for each of said units and each said further piston and cylinder means operated by one of said cams through a follower, a port at the lower end of said cylinder and piston means associated with the shiftable leg to be uncovered by the piston thereof, and a fluid connection extending from said further cylinder and piston means to the cylinder and piston means at said units whereby movement of the leg is governed by the motion of the cams, said further piston and cylinder means including a cylinder and piston arrangement operated by one of said cams through said follower and said fluid connection means including a fluid connection extending to said port and with accumulator means therein whereby movement of the piston is extended when said port is uncovered.

12. A muflti-ped vehicle of the character described including, a horizontally disposed chassis, a plurality of support units therefor at each side of the chassis and each of said units comprising a horizontally shiftable carriage and cylinder and piston means to reciprocate the same, a vertically shiftable leg carried by the carriage and cylinder and piston means to extend and retract the said leg, and means actuating each of said cylinder and piston means and comprising a prime mover and a plurality of cams rotated thereby, and including further cylinder and piston means for each of said units and each said further piston and cylinder means operated by one of said cams through a follower, fluid connection means extending from said further cylinder and piston means to the cylinder and piston means associated with said units to reciprocate the carriage, and a variable orifice in said fluid connection means whereby speed of movement of the carriage is governed when operated by the motion of the cam.

13. A multi-ped vehicle of the character described including, a horizontally disposed chassis, a plurality of support units therefor at each side of the chassis and each of said units comprising a horizontally shiftable carriage and cylinder and piston means to reciprocate the same, a vertically shiftable leg carried by the carriage and cylinder and piston means to extend and retract the said leg, and means actuating each of said cylinder and piston means and comprising a prime mover and a plurality of cams rotated thereby, and including further cylinder and piston means for each of said units and each said further piston and cylinder means operated by one of said cams through a follower, fluid connection means extending from said further cylinder and piston means to the cylinder and piston means to reciprocate the carriage, accumulator means in said fluid connection means and also a variable orifice therein whereby speed of movement of the carriage is governed when operated by the motion of the cam and restricted by said orifice.

References Cited in the file of this patent

UNITED STATES PATENTS

| | | |
|---|---|---|
| 840,876 | Steedman | Jan. 8, 1907 |
| 2,132,184 | Poche | Oct. 4, 1938 |
| 2,371,893 | Hyland | Mar. 20, 1945 |
| 2,631,795 | Schultz | Mar. 17, 1953 |
| 2,777,528 | Joudain | Jan. 15, 1957 |
| 2,822,878 | Corson | Feb. 11, 1958 |
| 2,918,738 | Barr | Dec. 29, 1959 |